(12) United States Patent
Arico

(10) Patent No.: US 10,940,781 B1
(45) Date of Patent: Mar. 9, 2021

(54) SEATBACK RECLINER SYSTEM FOR A VEHICLE SEAT OF A MOTOR VEHICLE

(71) Applicant: GM Global Technology Operations LLC, Detroit, MI (US)

(72) Inventor: Daniel Arico, New Baltimore, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 34 days.

(21) Appl. No.: 16/589,608

(22) Filed: Oct. 1, 2019

(51) Int. Cl.
  *B60N 2/42*   (2006.01)
  *B60N 2/433*  (2006.01)
  *B60N 2/22*   (2006.01)

(52) U.S. Cl.
  CPC .......... *B60N 2/433* (2013.01); *B60N 2/2227* (2013.01)

(58) Field of Classification Search
  CPC .............................. B60N 2/433; B60N 2/2227
  See application file for complete search history.

(56) References Cited

U.S. PATENT DOCUMENTS 9,751,432 B2 *   9/2017   Assmann ............. B60N 2/2356
10,800,296 B2 *  10/2020  Schmitz ................. B60N 2/236

\* cited by examiner

*Primary Examiner* — Syed A Islam
(74) *Attorney, Agent, or Firm* — Vivacqua Crane

(57) ABSTRACT

A seatback recliner system for a vehicle seat including a seat bottom and a seatback is provided. The system includes a latch mechanism movable between a latched state where the latch mechanism holds the seatback in a fixed angular position relative to the seat bottom and an unlatched state where the seatback is angularly movable relative to the seat bottom. A handle is movable between a rest position where the latch mechanism is disposed in the latched state and an actuated position where the latch mechanism is disposed in the unlatched state, in response to the handle receiving an actuation load from a user. A handle extension member is releasably mounted to the handle by a coupler that disengages the handle extension member from the handle such that the handle remains disposed in the rest position relative to the latch mechanism.

20 Claims, 6 Drawing Sheets

SEATBACK RECLINER SYSTEM FOR A VEHICLE SEAT OF A MOTOR VEHICLE

INTRODUCTION

The present disclosure relates to a seatback recliner system for a vehicle seat of a motor vehicle, and more particularly, to a seatback recliner system having a handle assembly that is efficiently integrated within the seat to provide compact packaging for the seat.

Modern vehicles seats have multiple systems with user interfaces integrated within the outboard side of the seat bottom for improving the overall driving experience of the passengers. The user interfaces are spaced from one another to allow a user to operate those user interfaces without interference from the other systems integrated within the seat. Furthermore, the user interfaces are arranged on the seat to prevent unintended actuation of associated systems, which could result from the deformation of the vehicle seat or other motion of the vehicle seat during a crash event.

One example of these systems includes a seatback adjuster system having a lock mechanism movable between a locked state for holding the seatback in a fixed angular position relative to a seat bottom and an unlocked state where the seatback can be tilted forward or rearward relative to the seat bottom. The seatback adjuster system further includes a lever that is connected to the lock mechanism and accessible to a user on the outboard side of the seat bottom. The lever is movable within a first range of motion for moving the lock from the locked state to the unlocked state.

Another example of these systems includes a height adjuster system having a ratcheting lift mechanism for adjusting the height of the vehicle seat. The height adjuster system further includes a handle, which is connected to the ratcheting lift mechanism and accessible to a passenger on the outboard side of the seat bottom. The handle is movable within a second range of motion for actuating the ratcheting lift mechanism to adjust the height of the vehicle seat.

The seatback adjuster system and the height adjuster system are arranged on the seat to allow a user to operate the lever of the seatback adjuster system and the handle of the height adjuster system without interference from components of the other system. Furthermore, during a crash event, support members, which support the seatback and the lever, may deform such that the seatback and the lever may tilt forward in unison with one another. Because there is clearance for the lever to tilt forward during the crash event, the lever is not inadvertently actuated and the seatback is not permitted to rapidly tilt forward and rearward during the crash event. Put another way, the lever is not held in place while the rest of the seatback adjuster system tilts forward. While the clearance between components of these systems allows a user to operate each system, the arrangement of systems can increase the size of the vehicle seat as compared to seats without these systems.

Thus, while seatback recliner systems for vehicle seats of motor vehicles achieve their intended purpose, there is a need for a new and improved seatback recliner system that addresses these issues.

SUMMARY

According to several aspects of the present disclosure, a seatback recliner system for a vehicle seat of a motor vehicle is provided. The vehicle seat includes a seat bottom and a seatback, and the seatback recliner system includes a latch mechanism attached to the seatback and the seat bottom. The latch mechanism is movable between a latched state where the latch mechanism holds the seatback in a fixed angular position relative to the seat bottom and an unlatched state where the seatback is angularly movable relative to the seat bottom. In addition, the seatback recliner system also includes a handle connected to the latch mechanism. The handle is movable between a rest position where the latch mechanism is disposed in the latched state and an actuated position where the latch mechanism is disposed in the unlatched state. The handle is movable to the actuated position in response to the handle receiving an actuation load from a user. The seatback recliner system further includes a biasing member configured to transmit a return load to the handle for returning the handle to the rest position, with the actuation load being higher than the return load. The seatback recliner system further includes a handle extension member releasably mounted to the handle by a coupler. The coupler disengages the handle extension member from the handle such that the handle extension member is movable relative to the handle and the handle remains disposed in the rest position relative to the latch mechanism, in response to the handle extension member receiving a crash event load that is equal to or higher than the actuation load.

In one aspect, the coupler is a resilient fastener connected to one of the handle and the handle extension member, with the resilient fastener being engaged with an opening that is formed in the other of the handle and the handle extension member.

In another aspect, the handle includes a socket having a plurality of teeth configured to engage the latch mechanism and a lever extending from the socket.

In another aspect, the handle extension member includes a collar rotatably coupled to the socket and a finger guard extending from the collar, such that the handle extension member is angularly displaceable relative to the handle. The finger guard includes a flange configured to extend from the lever of the handle and block a finger from wrapping around the lever.

In another aspect, the collar includes an arcuate surface surrounding an outer diameter surface of the socket, with the arcuate surface being configured to pivot about the outer diameter surface of the socket in response to the coupler receiving the crash event load.

In another aspect, the flange of the finger guard includes an elongated L-shaped bracket having first and second surfaces that are disposed perpendicular to one another.

In another aspect, the coupler is a spring connected to the handle extension member and configured to transmit a retention load to the handle extension member for urging the handle extension member against the handle, where the crash event load is higher than the retention load.

According to several aspects of the present disclosure, a vehicle seat of a motor vehicle includes a seatback, a seat bottom having an outboard side, and a side panel housing mounted to the outboard side of the seat bottom. The vehicle seat further includes a seat bottom adjustment system, which has a height adjustment mechanism attached to the seat bottom and is configured to adjust a height of the vehicle seat. In addition, the vehicle seat also includes a seatback recliner system having a latch mechanism attached to the seat bottom. The latch mechanism is configured to move between a latched state where the latch mechanism holds the seatback in a fixed angular position relative to the seat bottom and an unlatched state where the seatback is angularly movable relative to the seat bottom. The latch mechanism and the height adjustment mechanism are spaced a first distance from one another. The seatback recliner system further includes a handle connected to the latch mechanism. The handle is movable between a rest position where the latch mechanism is disposed in the latched state and an actuated position where the latch mechanism is disposed in the unlatched state. The handle is movable to the actuated position in response to the handle receiving an actuation load from a user. The seatback recliner system further includes a biasing member configured to transmit a return load to the handle for returning the handle to the rest position, with the actuation load being higher than the return load. The seatback recliner system further includes a handle extension member releasably mounted to the handle by a coupler. The handle extension member terminates at a tip that is spaced a second distance from the latch mechanism, with the second distance being longer than the first distance between the latch mechanism and the height adjustment mechanism. The coupler disengages the handle extension member from the handle such that the handle extension member is movable relative to the handle and the handle remains disposed in the rest position relative to the latch mechanism, in response to the handle extension member receiving a crash event load that is equal to or higher than the actuation load. The handle extension member is configured to engage the side panel housing for receiving the crash event load and disengaging the handle extension member from the handle.

In one aspect, the coupler is a resilient fastener connected to one of the handle and the handle extension member, with the resilient fastener being engaged with an opening that is formed in the other of the handle and the handle extension member.

In another aspect, the handle is movable within a first plane as the handle moves between the rest position and the actuated position, and the first plane does not intersect the side panel housing.

In another aspect, the handle extension member is movable within a second plane as the handle moves between the rest position and the actuated position, and the second plane intersects the side panel housing.

In another aspect, the side panel housing has a stepped outboard surface including inboard and outboard sections spaced from one another and a shoulder connecting the inboard and outboard sections together. The inboard section and the shoulder define a recess in the stepped outboard surface, with the handle extension member being movable within the recess and engaging the shoulder to receive the crash event load.

In another aspect, the inboard and outboard sections of the stepped outboard surface are disposed parallel to one another.

In another aspect, the handle is movable within the first plane that is disposed adjacent to and parallel with the outboard section of the stepped outboard surface.

In another aspect, the handle extension member is movable within the second plane that is disposed adjacent to and parallel with the inboard section of the stepped outboard surface.

In another aspect, the handle extension member includes a collar rotatably coupled to the handle and a finger guard extending from the collar such that the handle extension member is angularly displaceable relative to the handle. The finger guard is a flange configured to extend from the lever of the handle and block a finger from wrapping around the lever.

In another aspect, the coupler is a spring connected to the handle extension member and configured to transmit a retention load to the handle extension member for urging the handle extension member against the handle, with the crash event load being higher than the retention load.

According to several aspects of the present disclosure, a method for operating a seatback recliner system for a vehicle seat of a motor vehicle is provided. The vehicle seat includes a seat bottom and a seatback, and the seatback recliner system includes a latch mechanism, a handle, a biasing member, and a handle extension member releasably mounted to the handle by a coupler. The method includes the steps of moving the handle from a rest position to an actuated position relative to the latch mechanism, in response to the handle receiving an actuation load. The method further includes moving the latching mechanism from a latched state where the latch mechanism holds the seatback in a fixed angular position relative to the seat bottom to an unlatched state where the seatback is angularly movable relative to the seat bottom, in response to the handle moving from the rest position to the actuated position. The method further includes the seatback moving angularly rearward relative to the seat bottom. The method further includes a biasing member transmitting a return load to the handle for returning the handle to the rest position. The method further includes transmitting a crash event load to the handle extension member in response to the handle moving angularly forward relative to the seat bottom while the handle remains disposed in the rest position relative to the latch mechanism. The crash event load is equal to or higher than the actuation load. The method further includes the coupler disengaging the handle extension member from the handle, such that the handle extension member is movable relative to the handle with the handle remaining disposed in the rest position and the latch mechanism remaining disposed in the latched state, in response to the handle extension member receiving the crash event load.

In one aspect, the coupler transmits a portion of the actuation load from the handle extension member to the handle for moving the handle from the rest position to the actuated position.

In another aspect, the handle extension member moves relative to the handle such that the latch mechanism remains disposed in the latched state and the seatback is held in a fixed angular position relative to the seat bottom, in response to the handle extension member disengaging from the handle.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
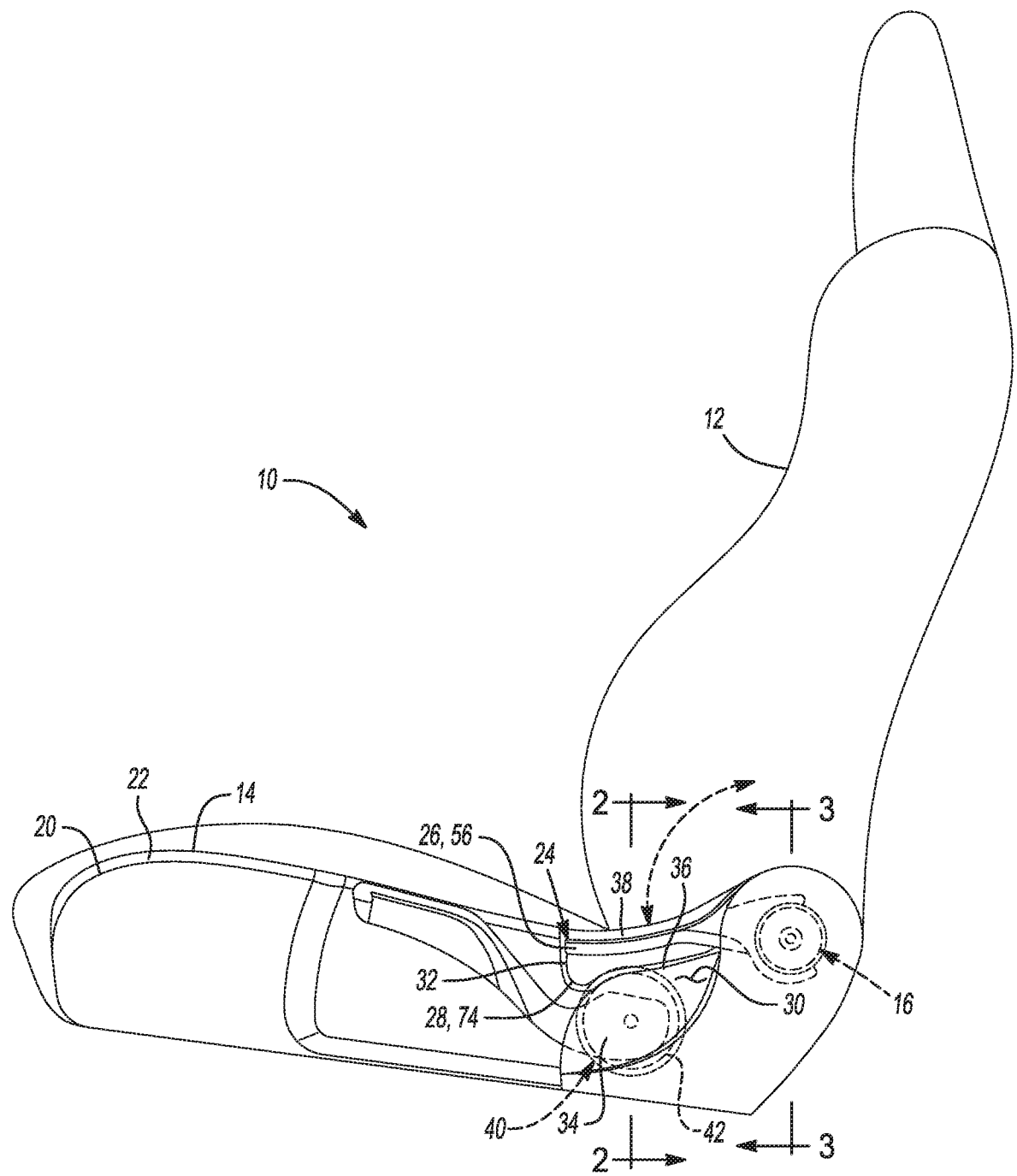
FIG. 1 is a side view of a vehicle seat for a motor vehicle, illustrating the vehicle seat having a seatback, a seat bottom, and a seatback recliner system that has a split handle assembly disposed in a rest position.

Referring to FIG. 1, there is generally illustrated a vehicle seat 10 for a motor vehicle. The vehicle seat 10 includes a seatback 12, a seat bottom 14, and a seatback recliner system 16, which has a latch mechanism 18 (FIG. 3) attached to the seatback 12 and the seat bottom 14. The seat bottom 14 has an outboard side 20, and the vehicle seat 10 further includes a side panel housing 22 mounted to the outboard side 20 of the seat bottom 14. As will be described in detail below, the seatback recliner system 16 further a split handle assembly 24 having a handle 26 and a handle extension member 28, which are arranged relative to the side panel housing 22 to allow a user to operate the split handle assembly 24 and provide compact packaging of the vehicle seat 10 while also preventing the unintended actuation of the seatback recliner system 16 during a crash event.

Figure 2A:
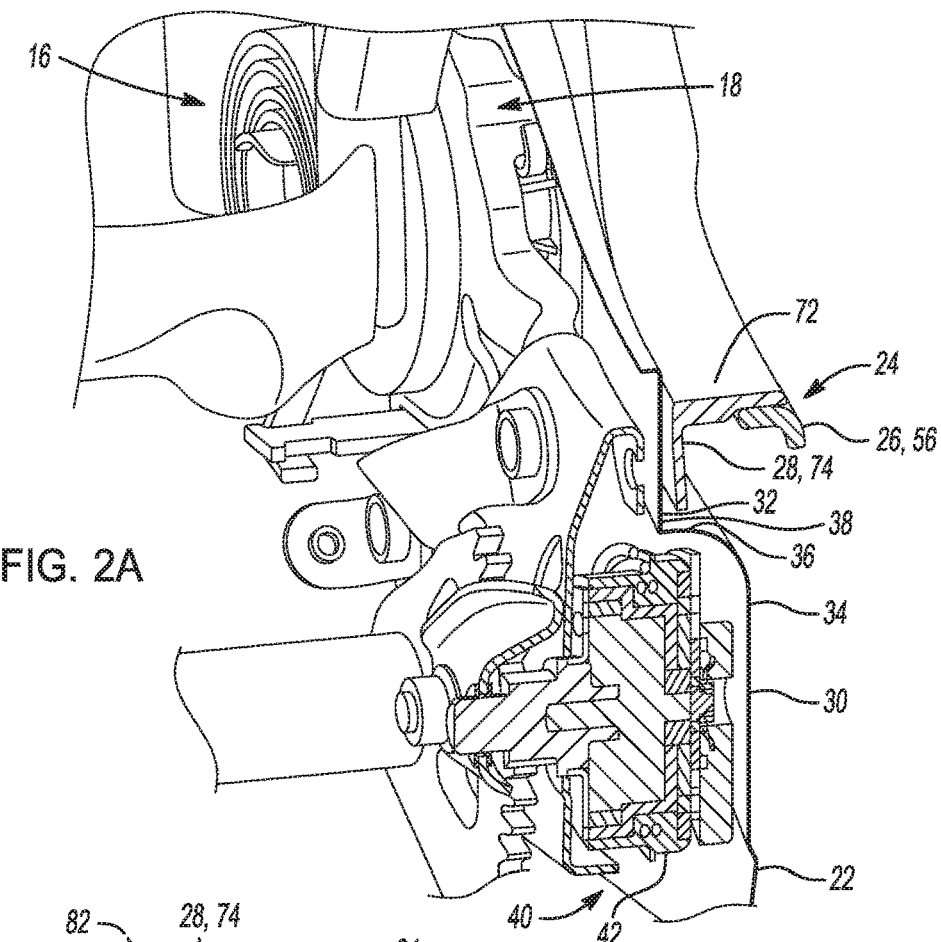
FIG. 2A is a perspective cross-sectional view of the vehicle seat of FIG. 1, as taken along line 2-2.
Figures 2B, 2C:
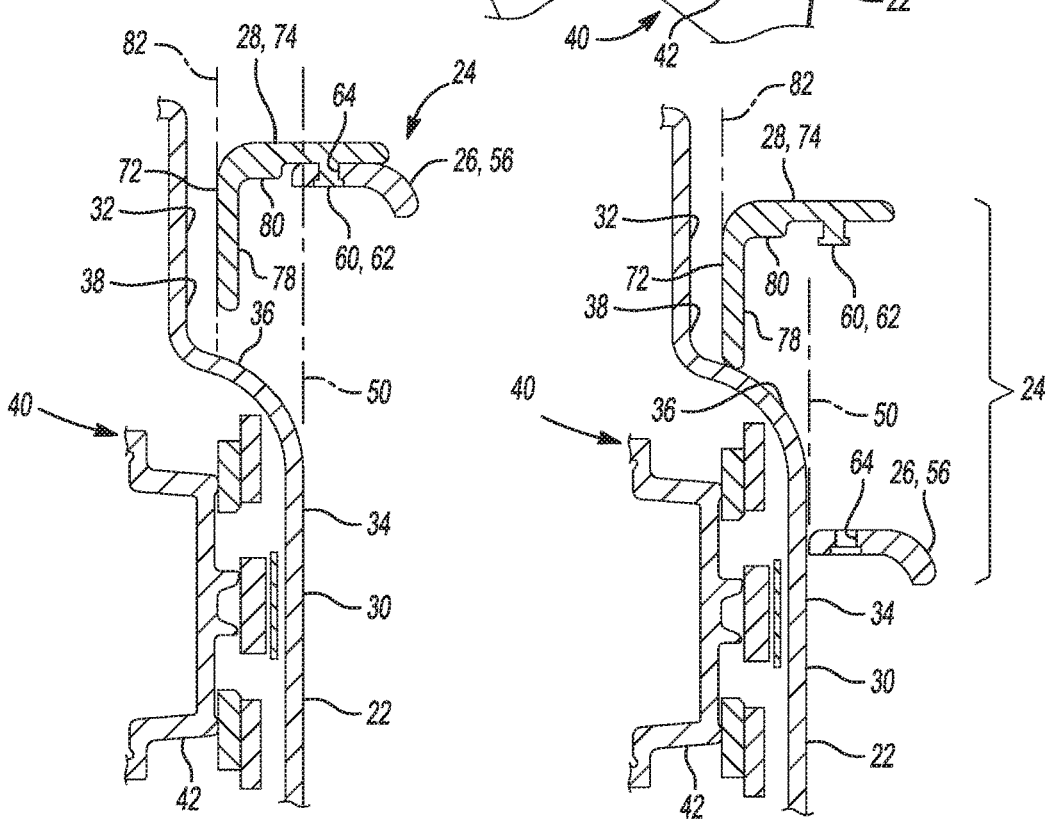
FIG. 2B is an enlarged cross-sectional view of the vehicle seat of FIG. 1, illustrating the split handle assembly including a handle extension member releasably mounted to a handle by a coupler when the handle is disposed in the rest position.
FIG. 2C is an enlarged cross-sectional view of the vehicle seat of FIG. 1, illustrating the handle extension member disengaged from the handle to prevent moving the handle to an actuated position during a crash event.

Referring to FIGS. 2A-2C, the side panel housing 22 has a stepped outboard surface 30 that provides clearance for the handle when the vehicle seat deforms during a crash event. The stepped outboard surface 30 includes an inboard section 32, an outboard section 34 spaced from the inboard section 32, and a shoulder 36 connecting the inboard and outboard sections 32, 34 together. The inboard and outboard sections 32, 34 are planar and disposed parallel to one another. In addition, the inboard section 32 and the shoulder 36 define a recess 38 in the stepped outboard surface 30. It is contemplated that the inboard outboard sections can be non-planar, and the side panel housing can have other suitable shapes that provide clearance for the handle during a crash event.

The vehicle seat 10 includes one or more systems, including the seatback recliner system 16. The systems are integrated within the seat bottom 14 and covered by the side panel housing 22. In this example, the vehicle seat 10 includes a seat bottom adjustment system 40 integrated within the seat bottom 14. The seat bottom adjustment system 40 includes a height adjustment mechanism 42 that is attached to the seat bottom 14 for adjusting a height of the vehicle seat 10. It is contemplated that the vehicle seat 10 can include a ventilation system, a heating system, a massage system, other suitable systems or combinations thereof, which are integrated within the seat bottom, the seat back, or both the seat bottom and the seat back.

Figure 3:
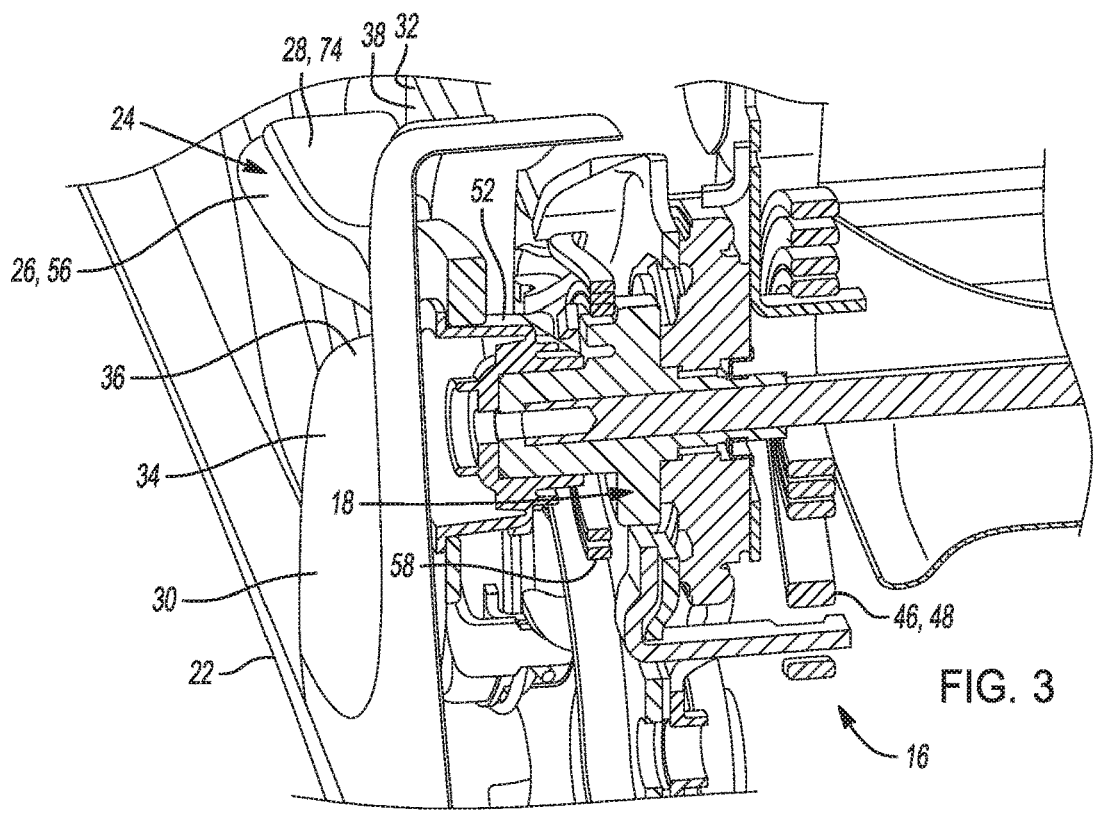
FIG. 3 is a cross-sectional view of the vehicle seat of FIG. 1, as taken along line 3-3, illustrating the seatback recliner system including a handle assembly.
Figure 4:
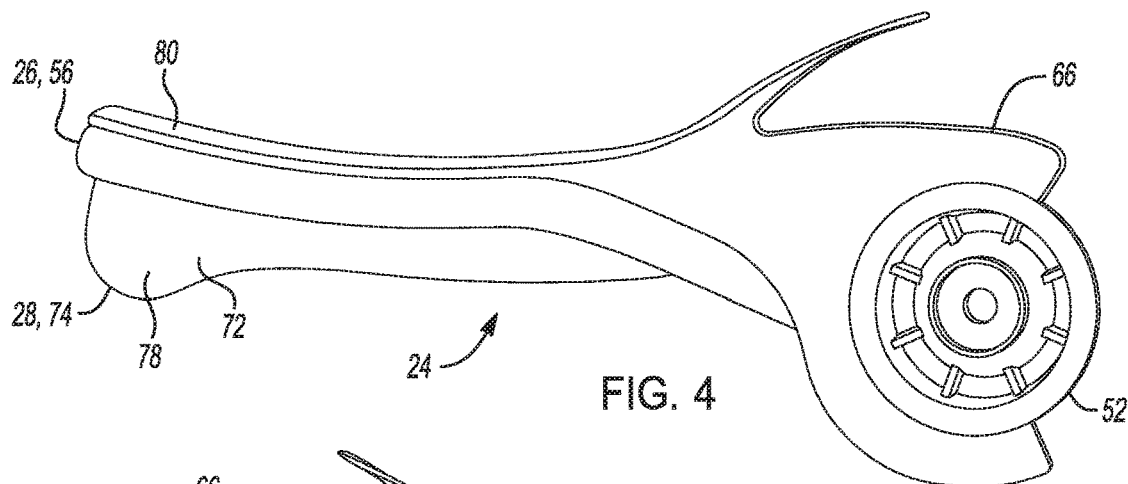
FIG. 4 is an outboard view of the handle assembly of FIG. 3, illustrating the handle assembly including the handle extension member releasably mounted to the handle.
Figure 5:
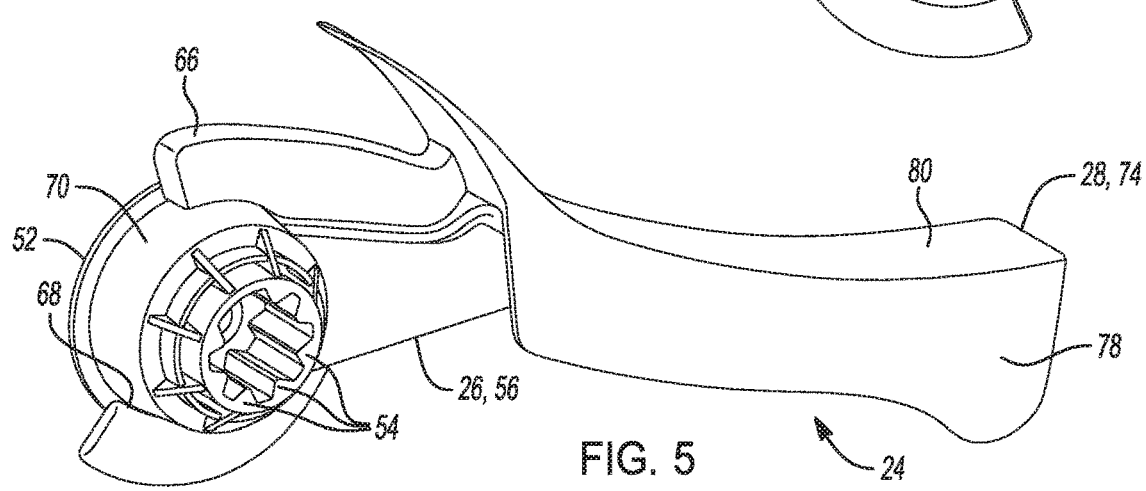
FIG. 5 is an inboard view of the handle assembly of FIG. 3.
Figure 9:
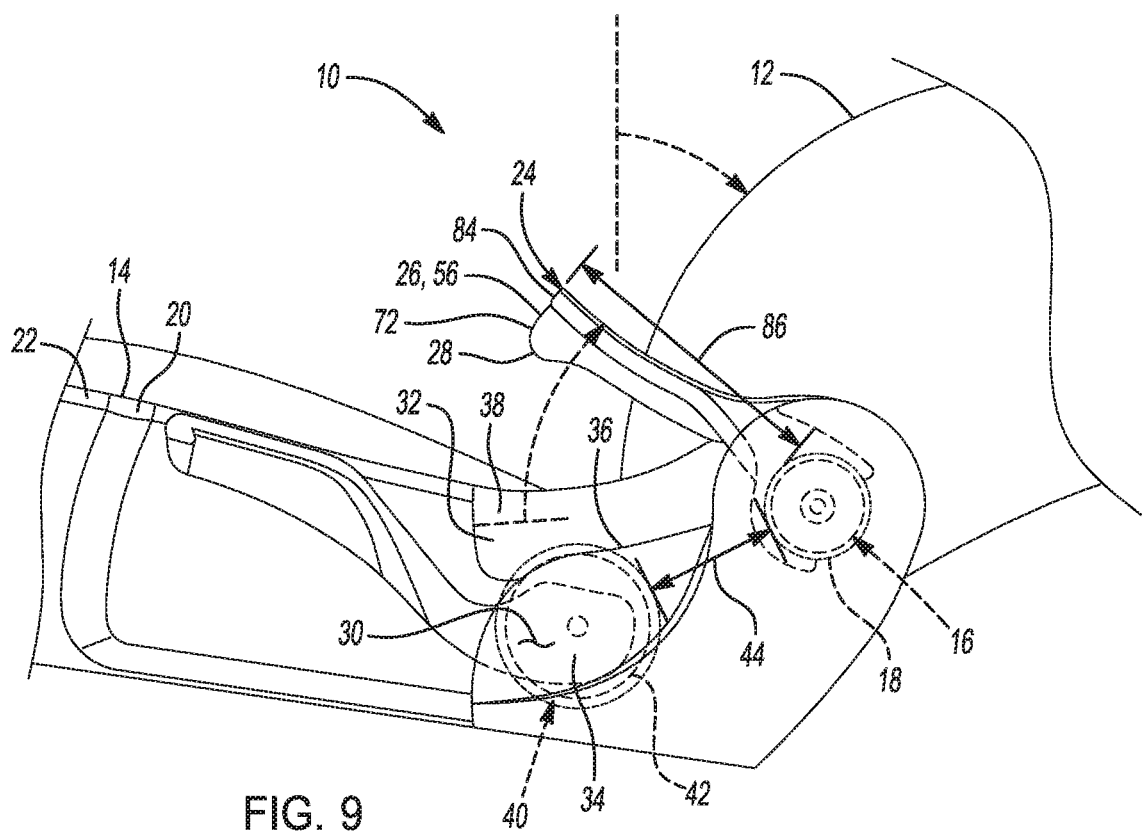
FIG. 9 is a side view of the vehicle seat of FIG. 1, illustrating the handle and the handle extension member moving together from a rest position to an actuated position such that the seatback is movable angularly rearward relative to the seat bottom.

Referring to FIG. 3, the seatback recliner system 16 includes a latch mechanism 18 attached to the seatback 12 and the seat bottom 14. The latch mechanism 18 is movable between a latched state where the latch mechanism 18 holds the seatback 12 in a fixed angular position relative to the seat bottom 14 and an unlatched state where the seatback 12 is angularly movable relative to the seat bottom 14. The latch mechanism 18 and the height adjustment mechanism 42 are spaced a first distance 44 (FIG. 9) from one another.

The seatback recliner system 16 further includes an urging device 46 configured to tilt the seatback 12 forward when the latch mechanism 18 is disposed in the unlatched state. For example, the urging device 46 can be a torsional spring 48 configured to apply a torque to the seatback 12 for tilting the same forward. However, it is contemplated that the urging device can be any suitable element for tilting the seatback 12 in a forward direction. Furthermore, the seatback 12 may be reclined in a rearward direction, in response to a passenger applying a torque to the seatback 12 that overcomes the torque of the urging device 46.

The split handle assembly 24 includes a handle 26 connected to the latch mechanism 18, and the handle 26 is configured to move between a rest position (FIG. 1) relative to the latch mechanism 18 where the latch mechanism 18 is disposed in the latched state and an actuated position (FIG. 9) relative to the latch mechanism 18 where the latch mechanism 18 is disposed in the unlatched state.

Referring to FIGS. 3-8, the handle 26 includes a socket 52 having a plurality of teeth 54 (FIG. 5) that are configured to engage the latch mechanism and transmit torque to the latch mechanism. The handle 26 further includes a lever 56 extending from the socket 52. The lever 56 can be grasped by the user to receive the actuation load and transmit the same to the socket 52, which in turn moves the latch mechanism 18 from the unlatched state to the latched state. The handle 26 is movable to the actuated position in response to the handle 26 receiving the actuation load from a user.

Figure 10:
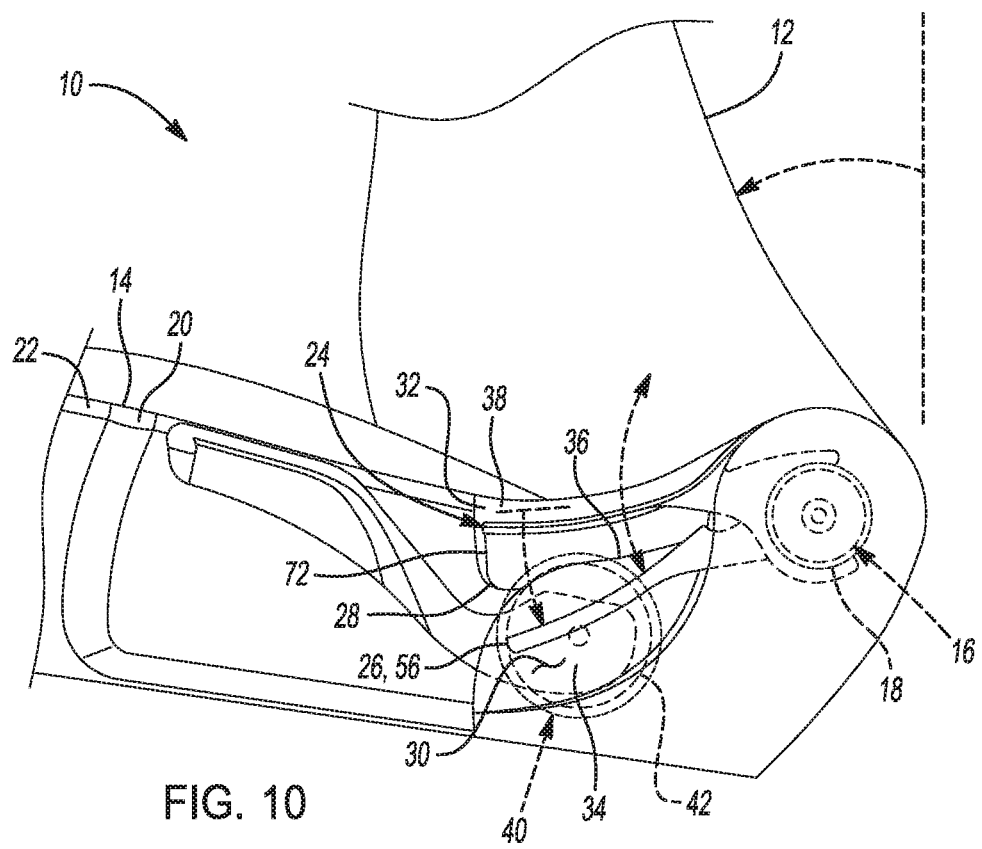
FIG. 10 is a side view of the vehicle seat of FIG. 1, illustrating the handle extension member disengaging from the handle and moving relative to the handle, such that the handle remains in the rest position relative to the seatback and the seatback does not move angularly rearward during a crash event.

Referring to FIGS. 2C and 10, the vehicle seat 10 is configured to prevent the handle 26 from moving from the rest position to the actuated position relative to the latch mechanism during a crash event. In particular, the handle 26 is configured to move within a first plane 50, and the first plane 50 does not intersect the side panel housing 22. The first plane 50 is disposed adjacent to and parallel with the outboard section 34 of the stepped outboard surface 30 for the side panel housing 22. During a front collision, the vehicle seat 10 may deform such that the seatback 12 tilts forward (FIG. 10), which in turn causes the handle 26 to move angularly downward. The side panel housing 22 provides clearance for the handle 26 such that the handle 26 remains in the rest position relative to the latch mechanism 18, and the latch mechanism remains in the latched state during the crash event.

The seatback recliner system 16 further includes a biasing member 58 (FIG. 3) configured to transmit a return load to the handle 26 for returning the handle 26 to the rest position. The actuation load is higher than the return load such that the user can overcome the return load of the biasing member 58 and move the handle 26 from the rest position to the actuated position.

Referring to FIGS. 2B and 4-8, the split handle assembly 24 further includes a handle extension member 28 releasably mounted to the handle 26 by a coupler 60 for transmitting a portion of the actuation load to the handle 26. The combination of the handle 26 and the handle extension member 28 can distribute force across a portion of the user's fingers to improve the comfort in operating the split handle assembly. The handle extension member 28 further includes a finger guard 72 extending radially from the collar 66. The finger guard 72 includes a flange 74 configured to extend in an inboard direction from the lever 56 of the handle 26 for blocking the user's finger from contacting the side panel housing 22 or wrapping around the lever 56. The flange 74 is an elongated L-shaped bracket having first and second surfaces 78, 80 that are disposed perpendicular to one another. The handle extension member 28 is movable within the recess 38 defined by the inboard section 32 and the shoulder 36 of the side panel housing 22. At least a portion of the handle extension member 28 is configured to move within a second plane 82 as the handle 26 moves between the rest and actuated positions during normal operation of the system. The second plane 82 is disposed adjacent to and parallel with the inboard section 32 of the side panel housing 22.

In this example, the handle extension member 28 includes a collar 66 rotatably coupled to the socket 52 of the handle 26 such that the handle extension member 28 is angularly displaceable relative to the handle 26 during a crash event. The collar 66 has an arcuate surface 68 surrounding an outer diameter surface 70 of the socket 52, and the arcuate surface 68 is configured to pivot about the outer diameter surface 70 of the socket 52 in response to the coupler 60 receiving the crash event load.

Figure 6:
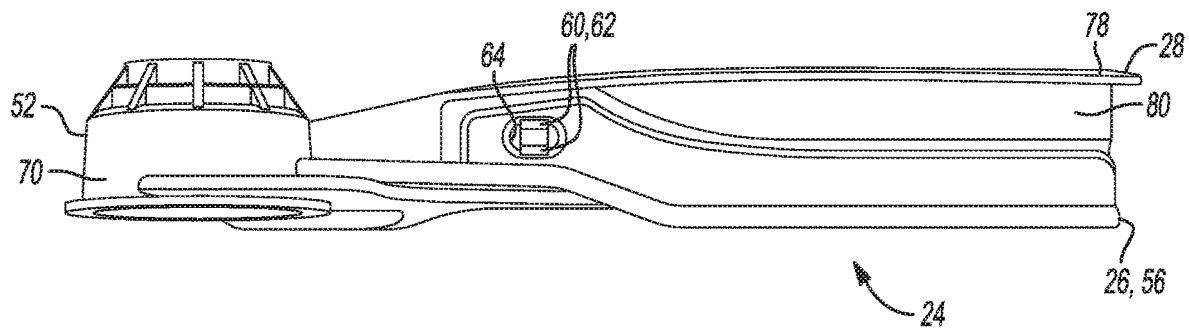
FIG. 6 is a bottom view of the handle assembly of FIG. 3, illustrating a coupler releasably mounting the handle and the handle extension member together.
Figure 7:
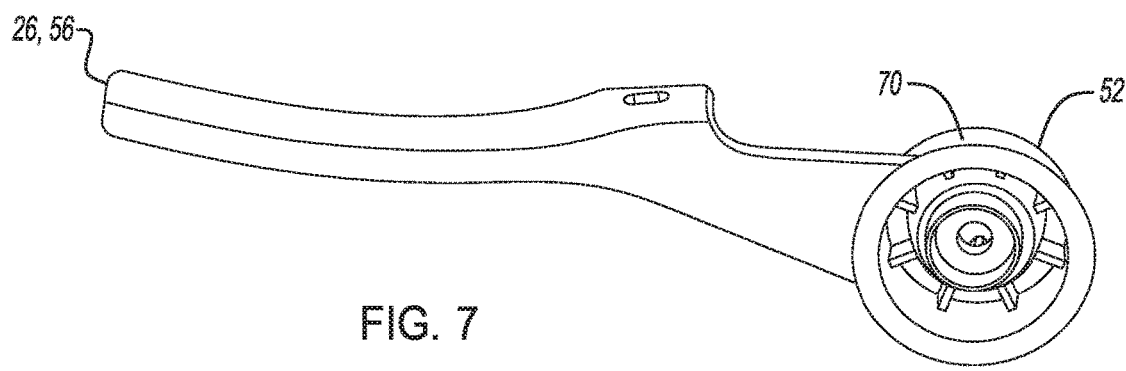
FIG. 7 is an outboard view of the handle of FIG. 4.
Figure 8:
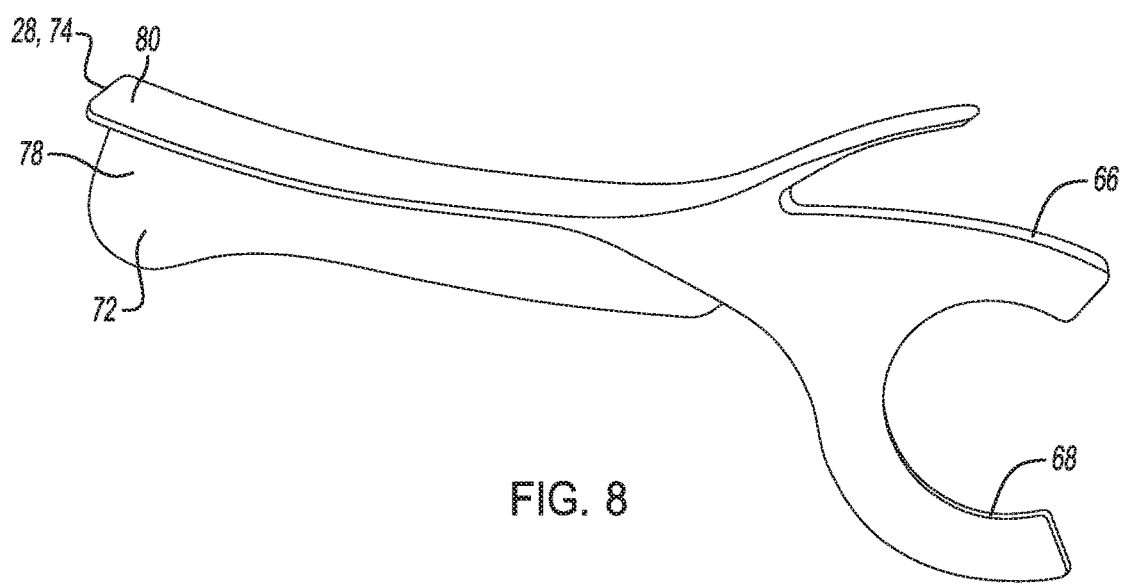
FIG. 8 is an outboard view of the handle extension member of FIG. 4.

Referring to FIGS. 2C, 6, and 7, the coupler 60 allows the handle extension member 28 to separate or disengage from the handle 26, in response to the handle extension member 28 receiving a crash event load from the side panel housing 22 that is equal to or higher than the actuation load. When the handle extension member 28 is disengaged from the handle 26, the handle extension member 28 and the handle 26 are movable relative to one another, and the handle 26 remains disposed in the rest position relative to the latch mechanism 18 as the handle 26 moves within the first plane 50 during the crash event. In this example, the coupler 60 is a resilient fastener 62 connected to one of the handle 26 and the handle extension member 28, with the resilient fastener 62 being engaged with an opening 64 that is formed in the other of the handle 26 and the handle extension member 28. The resilient fastener 62 can include one or more frangible snap-fit tangs that detach from the opening 64 in response to receiving the crash event load. It is contemplated that the split handle assembly can include other suitable couplers.

Figure 11:
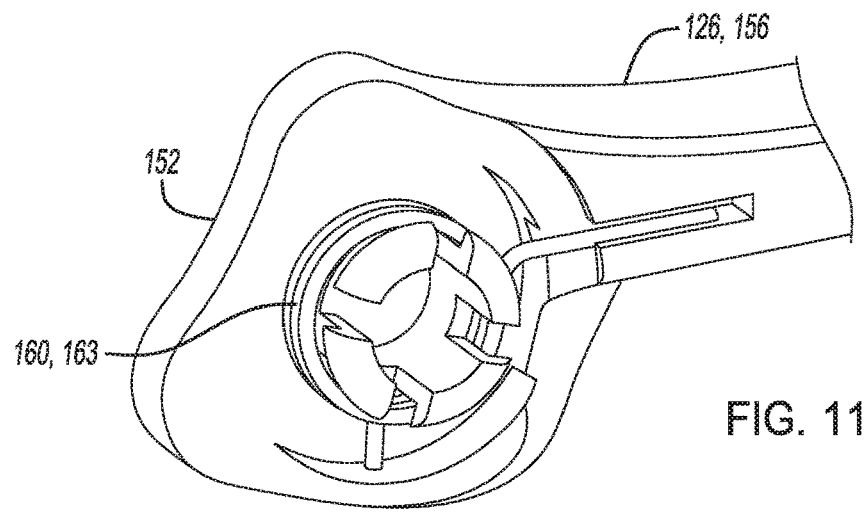
FIG. 11 is an outboard view of another example of a coupler and a handle for the split handle assembly.

Referring to FIGS. 2C and 10, the vehicle seat 10 may deform during a front collision such that the seatback 12 tilts forward, which in turn causes the handle 26 and the handle extension member 28 to move angularly downward. The handle extension member 28 engages the shoulder 36 of the side panel housing 22 to receive the crash event load and disengage or separate from the handle 26 as the handle 26 continues to move angularly downward without the handle extension member 28. More specifically, the handle extension member 28 is movable within the second plane 82, which intersects the shoulder 36 of the side panel housing 22. The handle extension member 28 terminates at a tip 84 that is spaced a second distance 86 from the latch mechanism 18 that is longer than the first distance 44 between the height adjustment mechanism 42 and the latch mechanism 18, such that the handle extension member 28 can be blocked by the shoulder 36 that covers the height adjustment mechanism 42. It is contemplated that the components of Referring to FIG. 11, another embodiment of a handle 126 has a coupler 160 and is similar to the handle 26 of FIG. 6 having the coupler 60. However, while the coupler 60 of FIG. 6 includes one or more frangible snap-fit tangs 63, the coupler 160 of FIG. 11 is a torsional spring 163 connected to the handle extension member 128. The torsional spring 163 is configured to transmit a retention load to the handle extension member 128 for urging the handle extension member 128 against the handle 126, where the crash event load is higher than the retention load.

Figure 12:
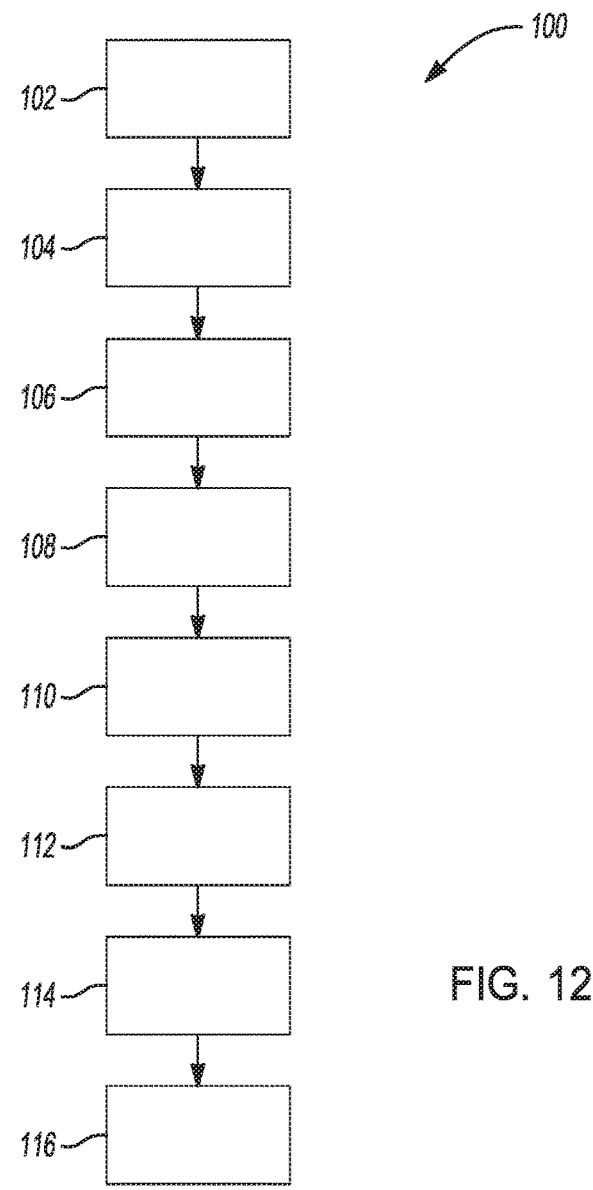
FIG. 12 is a flow chart of a method for operating the seatback recliner system of FIG. 1.

Referring to FIG. 12, a flowchart of a method 100 for operating the seatback recliner system of FIG. 1 is provided. The method 100 commences at step 102 with the actuation load being transmitted to the handle 26. In this non-limiting example, a user may grasp the handle 26 to manually apply the actuation load to the handle 26.

At step 104, the handle 26 moves from the rest position to the actuated position relative to the latch mechanism 18, in response to the handle 26 receiving the actuation load from the user.

At step 106, the latch mechanism 18 moves from the latched state where the latch mechanism 18 holds the seatback 12 in a fixed angular position to an unlatched state, in response to the handle 26 moving from the rest position to the actuated position. The coupler 60 can be used to transmit a portion of the actuation load from the handle extension member 28 to the handle 26 for moving the handle from the rest position to the actuated position. In the alternative, the handle 26 can directly receive the entire actuation load from the user.

At step 108, the seatback 12 is moved angularly rearward relative to the seat bottom 14 while the latch is disposed in the unlatched state. For example, the user may lean back against the seatback 12 while holding the handle 26 in the actuation position. It is contemplated that any suitable driving member can be used to move the seatback angularly rearward.

At step 110, the biasing member 58 transmits the return load to the handle 26 for returning the handle 26 to the rest position after the user releases the handle 26. The actuation load is higher than the return load.

At step 112, the crash event load is transmitted to the handle extension member 28 in response to the handle 26 moving angularly forward relative to the seat bottom 14. The crash event load being equal to or higher than the actuation load.

At step 114, the coupler 60 allows the handle extension member 28 to separate or disengage from the handle 26 such that the handle extension member 28 and the handle 26 are movable relative to one another. This allows the handle 26 to remain disposed in the rest position and the latch mechanism 18 to remain disposed in the latched state, in response to the handle extension member 28 receiving the crash event load from the side panel housing.

At step 116, the handle extension member 28 moves relative to the handle 26 such that the latch mechanism 18 remains disposed in the latched state and the seatback 12 is held in a fixed angular position relative to the seat bottom 14, in response to the handle extension member disengaging from the handle.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A seatback recliner system for a vehicle seat of a motor vehicle, with the vehicle seat including a seat bottom and a seatback, the seatback recliner system comprising:
   a latch mechanism attached to the seatback and the seat bottom, with the latch mechanism being movable between a latched state where the latch mechanism holds the seatback in a fixed angular position relative to the seat bottom and an unlatched state where the seatback is angularly movable relative to the seat bottom;
   a handle connected to the latch mechanism and movable between a rest position where the latch mechanism is disposed in the latched state and an actuated position where the latch mechanism is disposed in the unlatched state, wherein the handle is movable to the actuated position in response to the handle receiving an actuation load from a user;
   a biasing member configured to transmit a return load to the handle for returning the handle to the rest position, with the actuation load being higher than the return load; and
   a handle extension member releasably mounted to the handle by a coupler;
   wherein the coupler disengages the handle extension member from the handle such that the handle extension member is movable relative to the handle and the handle remains disposed in the rest position relative to the latch mechanism, in response to the handle extension member receiving a crash event load that is equal to or higher than the actuation load.

2. The seatback recliner system of claim 1 wherein the coupler comprises a resilient fastener connected to one of the handle and the handle extension member, with the resilient fastener being engaged with an opening that is formed in the other of the handle and the handle extension member.

3. The seatback recliner system of claim 2 wherein the handle comprises a socket having a plurality of teeth configured to engage the latch mechanism and a lever extending from the socket.

4. The seatback recliner system of claim 3 wherein the handle extension member comprises a collar rotatably coupled to the socket and a finger guard extending from the collar such that the handle extension member is angularly displaceable relative to the handle, wherein the finger guard comprises a flange configured to extend from the lever of the handle and block a finger from wrapping around the lever.

5. The seatback recliner system of claim 4 wherein the collar comprises an arcuate surface surrounding an outer diameter surface of the socket, with the arcuate surface being configured to pivot about the outer diameter surface of the socket in response to the coupler receiving the crash event load.

6. The seatback recliner system of claim 4 wherein the flange of the finger guard comprises an elongated L-shaped bracket having first and second surfaces that are disposed perpendicular to one another.

7. The seatback recliner system of claim 1 wherein the coupler is a spring connected to the handle extension member and configured to transmit a retention load to the handle extension member for urging the handle extension member against the handle, wherein the crash event load is higher than the retention load.

8. A vehicle seat of a motor vehicle, the vehicle seat comprising:
   a seatback;
   a seat bottom having an outboard side;
   a side panel housing mounted to the outboard side of the seat bottom;
   a seat bottom adjustment system comprising a height adjustment mechanism attached to the seat bottom and configured to adjust a height of the seat bottom; and
   a seatback recliner system comprising:
      a latch mechanism attached to the seatback and the seat bottom, with the latch mechanism being movable between a latched state where the latch mechanism holds the seatback in a fixed angular position relative to the seat bottom and an unlatched state where the seatback is angularly movable relative to the seat bottom, wherein the latch mechanism and the height adjustment mechanism are spaced a first distance from one another;
      a handle connected to the latch mechanism and movable between a rest position where the latch mechanism is disposed in the latched state and an actuated position where the latch mechanism is disposed in the unlatched state, wherein the handle is movable to the actuated position in response to the handle receiving an actuation load from a user;
      a biasing member configured to transmit a return load to the handle for returning the handle to the rest position, with the actuation load being higher than the return load; and
      a handle extension member releasably mounted to the handle by a coupler and terminating at a tip that is spaced a second distance from the latch mechanism, with the second distance being longer than the first distance;
      wherein the coupler disengages the handle extension member from the handle such that the handle extension member is movable relative to the handle and the handle remains disposed in the rest position relative to the latch mechanism, in response to the handle extension member receiving a crash event load that is equal to or higher than the actuation load; and
      wherein the handle extension member is configured to engage the side panel housing for receiving the crash event load and disengaging the handle extension member from the handle.

9. The vehicle seat of claim 8 wherein the coupler comprises a resilient fastener connected to one of the handle and the handle extension member, with the resilient fastener being engaged with an opening that is formed in the other of the handle and the handle extension member.

10. The vehicle seat of claim 9 wherein the handle is movable within a first plane as the handle moves between the rest position and the actuated position, and the first plane does not intersect the side panel housing.

11. The vehicle seat of claim 10 wherein the handle extension member is movable within a second plane as the handle moves between the rest position and the actuated position, and the second plane intersects the side panel housing.

12. The vehicle seat of claim 11 wherein the side panel housing has a stepped outboard surface that comprises:
- an inboard section;
- an outboard section spaced from the inboard section; and
- a shoulder connecting the inboard and outboard sections together;
- wherein the inboard section and the shoulder define a recess in the stepped outboard surface, with the handle extension member movable within the recess and engaging the shoulder to receive the crash event load.

13. The vehicle seat of claim 12 wherein the inboard and outboard sections of the stepped outboard surface are disposed parallel to one another.

14. The vehicle seat of claim 13 wherein the handle is movable within the first plane that is disposed adjacent to and parallel with the outboard section of the stepped outboard surface.

15. The vehicle seat of claim 14 wherein the handle extension member is movable within the second plane that is disposed adjacent to and parallel with the inboard section of the stepped outboard surface.

16. The vehicle seat of claim 9 wherein the handle extension member comprises a collar rotatably coupled to the handle and a finger guard extending from the collar such that the handle extension member is angularly displaceable relative to the handle, wherein the finger guard comprises a flange configured to extend from a lever of the handle and block a finger from wrapping around the lever.

17. The vehicle seat of claim 8 wherein the coupler is a spring connected to the handle extension member and configured to transmit a retention load to the handle extension member for urging the handle extension member against the handle, wherein the crash event load is higher than the retention load.

18. A method for operating a seatback recliner system for a vehicle seat of a motor vehicle, with the vehicle seat including a seat bottom and a seatback, the seatback recliner system including a latch mechanism, a handle, a biasing member, and a handle extension member releasably mounted to the handle by a coupler, the method comprises the steps of:
- transmitting an actuation load to the handle;
- moving the handle from a rest position to an actuated position relative to the latch mechanism, in response to the handle receiving the actuation load;
- moving the latching mechanism from a latched state where the latch mechanism holds the seatback in a fixed angular position relative to the seat bottom and an unlatched state where the seatback is angularly movable relative to the seat bottom, in response to the handle moving from the rest position to the actuated position;
- moving angularly the seatback rearward relative to the seat bottom;
- using the biasing member to transmit a return load to the handle for returning the handle to the rest position;
- transmitting a crash event load to the handle extension member in response to the handle moving angularly forward relative to the seat bottom while the handle remains disposed in the rest position relative to the latch mechanism, with the crash event load being equal to or higher than the actuation load; and
- disengaging, using the coupler, the handle extension member from the handle such that the handle extension member is movable relative to the handle with the handle remaining disposed in the rest position and the latch mechanism remaining disposed in the latched state for holding the seatback in the fixed angular position relative to the seat bottom, in response to the handle extension member receiving the crash event load.

19. The method of claim 18 further comprising using the coupler to transmit a portion of the actuation load from the handle extension member to the handle for moving the handle from the rest position to the actuated position.

20. The method of claim 19 further comprising moving the handle extension member relative to the handle such that the latch mechanism remains disposed in the latched state and the seatback is held in the fixed angular position relative to the seat bottom, in response to the handle extension member disengaging from the handle.

\* \* \* \* \*